United States Patent Office 2,772,965
Patented Dec. 4, 1956

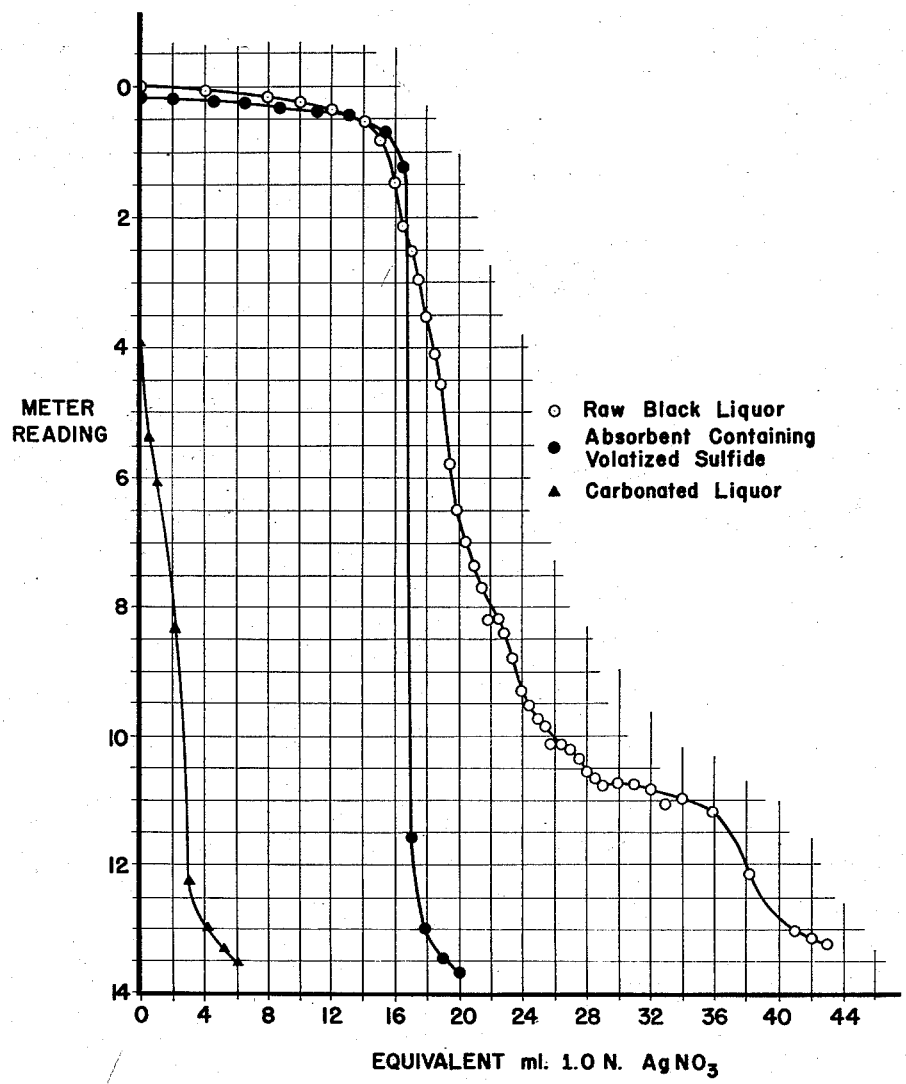

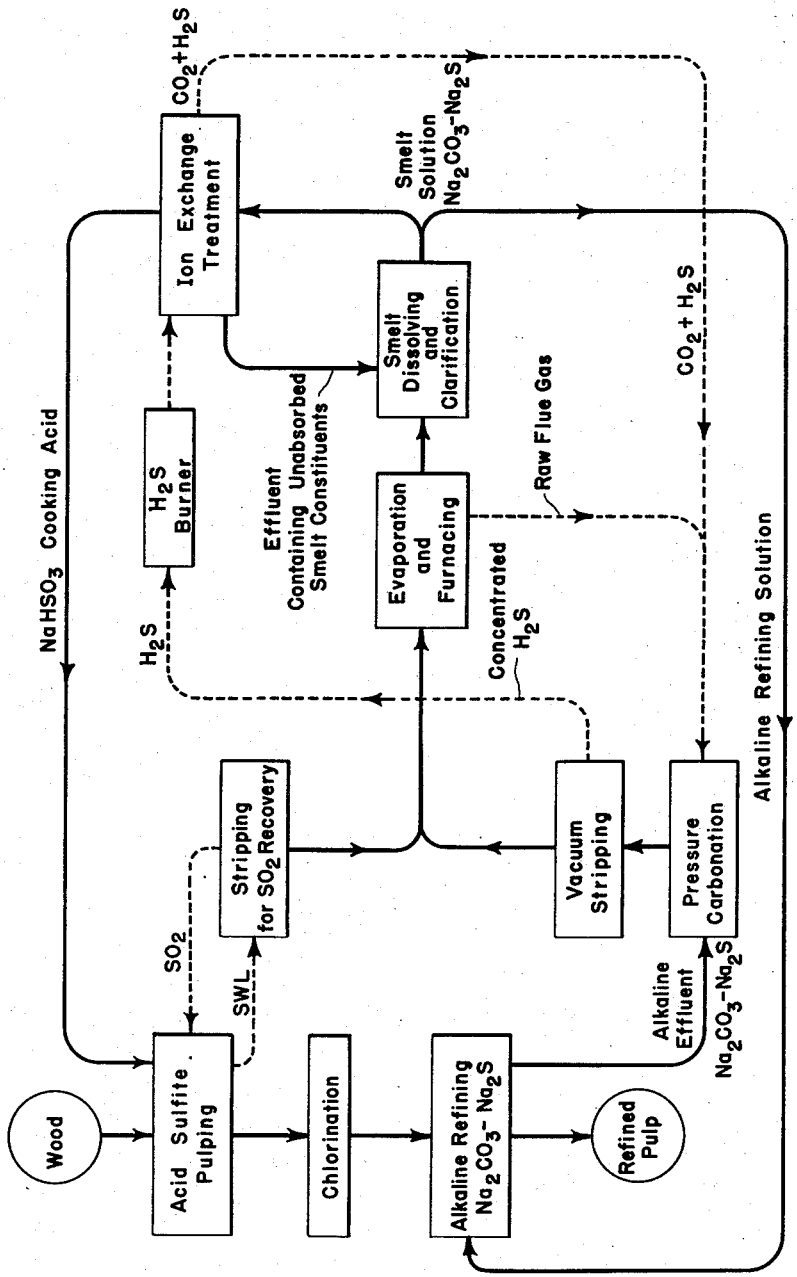

2,772,965

RECOVERY OF CHEMICALS IN WOOD PULP PREPARATION

Kenneth Russell Gray, Hartzell Lance Crosby, and John Charles Steinberg, Shelton, Wash., assignors to Rayonier Incorporated, Shelton, Wash., a corporation of Delaware Application June 2, 1953, Serial No. 359,146

19 Claims. (Cl. 92—2)

This application is a continuation-in-part of application Serial No. 166,683, filed June 7, 1950, now abandoned.

This invention relates to pulping operations for the digestion of wood chips with digestion liquor containing caustic soda and sodium sulfide in which the resulting waste liquor is evaporated and burned to form a smelt from which to recover sodium-containing chemicals. The invention provides improvements in the treatment of the waste liquor to lower the sulfur content prior to evaporation and burning, and for the separation from the liquor of an alkali-type lignin.

In the conventional operations for the recovery of chemicals from alkaline waste liquor containing a substantial amount of residual sodium sulfide, such as a kraft black liquor, hydrogen sulfide is released in dilute form during evaporation resulting in an uneconomical loss of sulfur, and creating undesirable atmospheric pollution. Such loss of sulfide sulfur in the form of very dilute hydrogen sulfide occurs particularly in the final stages of evaporation which is usualy effected by direct contact of the liquor with flue gas. Further, kraft pulping operations have been limited to the use of digestion liquors having a relatively low sulfide content in order to produce a smelt with a sufficiently low proportion of sodium sulfide to produce a smelt with a low melting point.

Recent proposals have been made to reduce sulfur loss in the evaporation of kraft black liquor by oxidation of potentially volatile sulfide sulfur to nonvolatile forms such as thiosulfate and sulfate. Such proposals, however, do not provide the low sulfur-to-sodium ratio, which must be maintained in order to get a smelt with a practically low melting point.

In normal kraft pulping operations, the ratio of sulfur to sodium is sufficiently low that smelts of a practical melting point (1500–1700° F.) are obtained. However, in producing special grades of cellulose, such as dissolving pulps, it may be desirable to operate with a sulfur-to-sodium ratio considerably higher than that normally used. The smelt obtained from the furnacing of black liquor resulting from this process will contain a very high proportion of sodium sulfide and consequently will have an undesirably high melting point.

In accordance with the improved process of our invention, we subject the sulfide-containing waste liquors, such as the black liquors from kraft pulping operations, and the like, to a pressure carbonation treatment followed by stripping under a vacuum to remove a very appreciable proportion of the sulfide sulfur as hydrogen sulfide, and simultaneously to separate from the liquor a lignin containing but a small amount of sodium and a small amount of organically combined sulfur. In addition to being applicable to the treatment of black liquors from kraft pulping of the conventional type, our process may be advantageously applied to alkaline waste liquors, such as result when the alkaline digestion has followed a prehydrolysis treatment of the wood. The carbonation process may also be applied to sulfide-containing black liquors from the alkaline refining of wood pulps which have already been substantially delignified in a prior treatment, such as by acid sulfite digestion. In this case, little or no lignin will precipitate out but nevertheless the advantages of the invention will still be obtained with regard to recovering concentrated hydrogen sulfide, minimizing sulfur losses and improving the flow properties of the resulting smelt in cases where these liquors are furnaced.

Wood digestion with liquors containing considerable sulfur will result in a higher than normal sulfur content in the black liquor. Increasing the sulfur-to-soda ratio of the liquor will proportionally increase the sulfide content of the resulting smelt. The presence of this sodium sulfide with a melting point of about 2200° F. necessitates high furnace operating temperatures and a corresponding increase in furnace maintenance problems. Fume loss from the furnace is also greatly increased.

That a very high content of sodium sulfide will result in a composition of extremely high melting point will be evident from Table I which illustrates the variations in fusion temperatures of various mixtures of Na$_2$S and Na$_2$CO$_3$. In column 3, the composition of the mixtures of column 1 has been calculated to express the total Na$_2$O present as Na$_2$S, which for this two component system is equivalent to the sulfidity.

TABLE I

| Percent Na$_2$S in Na$_2$S—Na$_2$CO$_3$ Mixture | Fusion Point, °C. | Percent of Total Na$_2$O Present as Na$_2$S |
|---|---|---|
| 0 | 852 | 0 |
| 6 | 830 | 8.0 |
| 15 | 815 | 19.3 |
| 30 | 805 | 36.7 |
| 38 | 800 | 45.4 |
| 42.5 | 795 | 50.0 |
| 50 | 810 | 57.5 |
| 60 | 835 | 67.0 |
| 70 | 890 | 76.0 |
| 75 | 940 | 80.3 |
| 82 | 970–990 | 86.0 |
| 100 | 1,180 | 100 |

In actual smelting operations, the smelt will also contain appreciable amounts of sodium sulfate and minor amounts of other sodium salts. These will tend to lower somewhat the fusion points given above for mixtures of pure sodium carbonate and sodium sulfide. For example, in one sample of smelt in which the percentage of the total Na$_2$O present as Na$_2$S was 45.0%; the Na$_2$CO$_3$, 45.0%; and Na$_2$SO$_4$, 10.0%, the fusion point was 738° C. In another sample of smelt in which the percentage of the total Na$_2$O present as Na$_2$S was 70.0%; the Na$_2$CO$_3$, 20%; and Na$_2$SO$_4$, 10.0%, the fusion point was 777° C.

As used in kraft pulping practice, and as used herein, the term "sulfidity" refers to the ratio of Na$_2$S to the sum of Na$_2$S+Na$_2$CO$_3$ all expressed on an Na$_2$O (i. e. equivalent) basis.

Table I above indicates that optimum results are obtained with a smelt of about 50% sulfidity (i. e., sulfur-to-sodium ratio of 0.25 on an atomic basis). In practice, however, it will frequently be advantageous to operate so as to produce a smelt of about 25–50% sulfidity or even lower. While the reason for this is not clear, it is believed to be due to the fact that in addition to the preponderance of sodium carbonate and sodium sulfide there will always be present smaller amounts of other sodium chemicals such as sodium sulfate, thiosulfate, and, if salt-water floated wood has been used, sodium chloride. These will modify the properties of the smelt.

Our process provides an improved process comprising the treatment of kraft type waste black liquor with carbon dioxide under pressure (carbonation) and at a sufficiently low temperature that the lignin which separates out will remain dispersed in semi-colloidal form. This is followed by stripping under a vacuum to release hydrogen sulfide in concentrated form, the solution still being below the sintering temperature of the lignin, preferably followed by increasing the temperature in order to partially agglomerate the semi-colloidally precipitated lignin, thereby facilitating its filtration and washing. In its more complete aspects, the invention provides a complete process comprising the carbonation and stripping of the liquor for the recovery of hydrogen sulfide and the reduction of the sulfidity of the liquor, the recovery, where desired, of a solid and useful alkali-type lignin low in sodium, the evaporation of the liquor and the burning of the resulting concentrate to form a smelt with a relatively low melting point, and the return of the chemicals of the smelt and the hydrogen sulfide for conversion to cooking liquors.

When the carbonation is carried out at a temperature below the apparent sintering point of the lignin in aqueous solution, the precipitate will be in a semi-collodial form, and it will generally be convenient to keep it in this form until after the stripping operation. In order to obtain a precipitate which can be readily filtered and washed, the solution is then heated to or slightly above the sintering point for a brief period to partially agglomerate the lignin particles, following which the solution is cooled to a temperature below the sintering point whereupon the lignin may be readily separated from the liquor by filtration.

Alternatively, the carbonation may be carried out at a temperature above the apparent melting point of the lignin. In such case, the lignin which separates out will melt to a heavy oily liquid or tar which can be removed as a liquid dreg from a separating chamber. It is frequently advantageous to effect such separation of fluid lignin prior to the stripping operation.

As used above "apparent sintering" or "apparent melting" points are the sintering and melting points of the precipitated lignin in the presence of liquor, said sintering or melting points being of the order of 70° C. to 90° C. depending upon the type of wood used, rather than the values of 140° C. to 210° C. obtained for completely sodium-free alkali-type lignins in the dry form.

The process of the invention gives several important advantages including removal from the liquor of potentially volatile sulfide sulfur with recovery in the form of concentrated hydrogen sulfide which may be conveniently reused in the pulping process; reduction of the sulfidity of the black liquor, improving furnace operation and reducing stack losses due to lowering of the melting point of the smelt; permitting, where desired, carrying out kraft pulping at higher sulfidities than have heretofore been practical from the standpoint of chemical recovery; minimizing atmospheric pollution resulting from H₂S and mercaptans in stack gases; permitting simultaneous economical recovery of a relatively pure, alkali-type lignin as a salable product, and efficient means of burning the separated lignin if desired.

The process of the invention will first be described with reference to the treatment of a typical kraft digestion waste black liquor. While our process is applicable to the treatment of liquor containing the usual amount of sodium sulfide, it is advantageously applicable to the treatment of liquors containing considerably more sodium sulfide than could be used in present operations. This is due to the fact that we can effectively reduce the sulfur content substantially, the exact value being dependent on the content of residual sulfide, thereby giving a lower melting point smelt. (In some conventional kraft cooks the reduction in sulfur content of the effluent by the process of the invention was of the order of 50–60%.)

Subject to some variations, as will appear from the following discussion, we prefer to subject the black liquor to a single stage of pressure carbonation and vacuum stripping, as described in our abandoned application Serial No. 166,683, filed June 7, 1950, which subject matter is now incorporated in application Serial No. 415,754, filed March 12, 1954.

In a preferred method of operation, the carbonation treatment is generally effected with any suitable form of carbon dioxide or carbon dioxide-containing gas at a temperature of 50°–150° C. with a gas pressure of 20–165 pounds per square inch absolute, such that the mol ratio of carbon dioxide absorbed to total titratable alkali in the solution is in the range of 0.6 to 1.5. Since carbonation is carried out at elevated temperature and sodium bicarbonate is consumed in the reaction with sodium hydrosulfide in the stripping operation, relatively concentrated solutions of sodium salts (e. g., of the order of 100 gm. per liter as Na₂O) may be treated without the precipitation of bicarbonate during processing. By "total titratable alkali" is meant the basicity equivalent to a standard acid titration to the methyl orange end point. In the case of soda smelts, this would include all of the sulfide, carbonate, and caustic soda, and one-half of the sulfite, and would exclude such salts as thiosulfate, sulfate, and chloride.

Under the stripping conditions of the invention, i. e., releasing the hot pressure carbonated solution into a vacuum, thus contacting it with steam at low temperature, very little bicarbonate decomposition occurs, with the result that the gas evolved is substantially hydrogen sulfide and water vapor. Steam is used as the stripping agent since a recovery of concentrated hydrogen sulfide gas can be effected simply by condensing the stream from the effluent mixture of steam and hydrogen sulfide. Use of low pressure in stripping as applied to this operation is an important technical feature of our invention. Reduced pressure markedly improves the conversion and apparently reduces carbon dioxide losses from bicarbonate decomposition.

Irrespective of whether pure CO₂ or flue gas is used for the carbonation, no attempt is made to completely eliminate sulfide in stripping since, as the stripping operation approaches completion, the efficiency of stripping with regard to steam consumption decreases tremendously.

The carbonation and stripping operations may be carried out in any tppe of equipment conventionally employed for gas absorption or stripping operations. Thus, for the carbonation and stripping, we may use packed columns, plate columns, spray columns, and continuous liquid phase columns. It is advantageous to use vessels or chambers for both the carbonation and stripping that permit easy separation of suspended or precipitated matter and which do not become plugged or fouled with separated lignin. Provision may be made for drawing off a lower layer or fraction containing the liquid or tar-like lignin product. Where the lignin is maintained in fine dispersion during carbonation and stripping, the lignin is preferably subsequently removed in solid granular form in separate equipment.

Flue gas may be used to advantage, requiring only slightly higher operating pressures or larger equipment than when using purer gas. Where a high degree of purity of the precipitated lignin product is desired, it may be advisable to purify the flue gas by removing suspended matter and scrubbing out any sulfur dioxide or other undesirable contaminant. Lime kiln gas, if available, may often be freed from suspended matter and used to advantage, since it will normally contain from 30% to 45% carbon dioxide.

When using diluted carbon dioxide (e. g., flue gas or lime kiln gas) in the pressure carbonation, countercurrent flow is advantageously used. Under these conditions, the gas leaving the top of the carbonator is in contact with highly alkaline solutions (e. g. waste black liquor). Because of the high alkalinity at the point of gas exit, the amount of hydrogen sulfide leaving the top of the carbonator in dilute form is substantially nil. As a result, the preponderant portion of the total hydrogen sulfide produced is liberated in the stripping operations in highly concentrated, readily usable form.

The solution obtained from the carbonation treatment is introduced into a stripper which is maintained at a pressure substantially below the carbonation pressure and below the vapor pressure of water at the temperature of the carbonation, whereby a "flashing" or sudden release of water vapor occurs accompanied by the simultaneous evolution of a portion of the hydrogen sulfide with only a relatively small proportion of carbon dioxide. Although not an essential feature of our process, it has been found desirable to allow the flashing to occur in the vapor space at the top of a column, whereupon the remaining liquid passes down through this column in contact with ascending steam supplied to the base of the column. This effects the efficient removal of the hydrogen sulfide formed in the process. The hydrogen sulfide may be returned to the process to form digestion liquor.

In a kraft pulping operation this hydrogen sulfide is conveniently absorbed in a solution of smelt either before or after causticization in order to raise the sulfidity to the desired point, and the causticized, sulfide-enriched liquor reused as wood pulping liquor. Where a carbonation pulping process involves an acid sulfite treatment of the wood prior to the alkaline digestion, at least a portion of the recovered concentrated hydrogen sulfide may be readily burned to sulfur dioxide for use in the preparation of the acid sulfite digestion liquor.

When the hydrogen sulfide has been effectively removed, the temperature of the stripped liquor is increased above 80° C. to agglomerate the lignin, and then is cooled below the sintering point to, say, around 40° C., in order to eliminate tackiness, whereupon the granular lignin may be readily filtered and washed. The lignin can be used for various purposes or burned. The lignin may be dissolved in a portion of the original black liquor which has by-passed the carbonation step, to obtain a solution of around 35% solids for burning, if desired.

The lignin may be recovered as a granular product very low in sodium and low in sulfur. When hardwood is digested, the lignin has a relatively low melting point and because of these properties has special industrial utilization.

The lignin recovered by the carbonation process, though in water-insoluble form, is a partial sodium derivative. The content of residual sodium in the precipitate is, however, small so that the amount of sodium withdrawn from the pulping system with the lignin is relatively small.

Where desired, the lignin precipitate recovered by the carbonation process of the invention may be treated before drying with a small portion of sulfuric or other mineral acid diluted with water. Such treatment converts the lignin to a sodium-free product which, after washing and drying, is thermoplastic and may be used for the manufacture of laminated paper plastics and other plastic products. Sodium sulfate solutions, formed in such final sodium removal step, may, if desired, be added to the black liquor at some point prior to furnacing for recovery of sodium and sulfur values. Hardwood lignins recovered by the carbonation process of the invention, when converted to sodium free form by such treatment, have the advantage of exceptionally low melting points, e. g., around 158° C.

Alternatively, instead of removing the sodium remaining in the lignin precipitate from the carbonation treatment to produce insoluble thermoplastic products, additional caustic soda may be added to the lignin precipitate to produce water-soluble salts suitable for use as dispersing agents, for compounding with rubber lattices, etc. This may be done by adjusting the pH to about 9.5 or higher and suitably drying the resulting solution to give a dry, water-soluble powder.

Where it is not desired to recover any or all of the lignin precipitate from the carbonation process for use as salable lignin products, this precipitate may be sent to the furnace to be burned as a fuel, either as such or after dissolving in a limited amount of uncarbonated black liquor. We may recover a lignin precipitate representing 30% of the organic material in the liquor which may be burned as a fuel or recovered at 50% total solids and dried as a commercial product.

The data recorded in Table II are indicative of the results which can be obtained by carbonating and stripping kraft black liquor. A few drops of a commercial antifoamant were added to reduce foaming and the carbon dioxide was introduced after the liquor had reached the desired temperature.

TABLE II

*Carbonation of black liquors*

| Test No. | 1 | 2 | 3 | 4 | 5 | 6 |
|---|---|---|---|---|---|---|
| Liquor Data: | | | | | | |
| Cook No. | 1 | 2 | 3 | 4 | 5 | 6 |
| Amount Treated, gms. | 107.75 | 104.08 | 105.70 | 105.40 | 108.07 | 108.07 |
| Total Solids, Percent | 18.1 | 18.1 | 16.2 | 16.2 | 16.4 | 16.4 |
| Total Na, gms. | 3.40 | 3.29 | 3.07 | 3.07 | | |
| Total S, gms. | 0.567 | 0.548 | 0.494 | 0.494 | 0.510 | 0.510 |
| Carbonation: Temperature, °C | 70–75 | 70–75 | 80 | 80 | 75 | 75–80 |
| Residual Liquor: | | | | | | |
| Weight, gms. | 89.50 | 99.97 | 108.55 | 103.30 | 107.38 | 110.70 |
| Total Solids, Percent | | | 10.2 | 12.8 | 12.5 | 11.5 |
| Total Na, gms. | 2.54 | 2.59 | 2.81 | 2.91 | | |
| Total S, gms. | 0.147 | 0.160 | 0.160 | 0.262 | 0.201 | 0.166 |
| Precipitate: | | | | | | |
| Weight, gms. | 30.50 | | 11.55 | 10.50 | 11.25 | 9.00 |
| Total Solids, Percent | | | 44.4 | 65.6 | 40.5 | 48.1 |
| Total S, gms. | 0.065 | 0.058 | 0.042 | 0.055 | 0.024 | 0.039 |
| Total Na, gms. | 0.46 | 0.28 | 0.22 | 0.27 | | |
| Absorbent for Volatile Sulfur (NaOH): | | | | | | |
| Volume, ml. | | | 321 | 296 | 425 | 444 |
| Total S, gms. (as analyzed) | | | 0.488 | 0.446 | 0.240 | 0.275 |
| Total S, gms. (by difference) | 0.355 | 0.330 | 0.292 | 0.177 | 0.285 | 0.305 |
| Apparent Sulfur Elimination, Percent | 62.6 | 60.2 | 59.1 | 35.8 | 55.9 | 59.8 |

The above data show that in the treatment of kraft liquors which contain caustic soda and sodium sulfide, the sulfide sulfur content of the black liquor can be reduced approximately 50 to 60% by solution carbonation.

Carbonation results in the precipitation of lignin in finely divided form. At temperatures below 70° C., the lignin remains dispersed; above 80° C., the lignin sinters or melts. By the previously outlined sequence of operations wherein precipitation below the sintering point is followed by heating to agglomerate the lignin and then cooling, the lignin can be recovered as a granular material. Alternatively, by precipitating above the melting point, the lignin may be recovered as a liquid which cools to a firm plastic mass. An appreciable amount of odorus material was also removed during carbonation as evidenced by the pungent smell of the absorbent and the reduced odor of the black liquor.

Sulfur balances are summarized in Table II with the sulfur reduction computed by difference between the sulfur in the starting liquor and that in the residual liquor plus precipitated lignin. Approximately 10% of the sulfur was unaccounted for, presumably due to loss of organic sulfur compounds not completely absorbed in the caustic soda or to losses of volatile $H_2S$ during analysis.

Fig. 1 of the accompanying drawings is a graph showing the results of the potentiometric titration of raw black liquor, carbonated black liquor, and absorbent containing volatilized sulfide. (Determinations made on samples of test No. 6 of Tables II and III.)

That all the sulfide sulfur was eliminated from the liquor by carbonation in test No. 6 and quantitatively absorbed in a suitable absorbent (NaOH) is evident from Fig. 1 showing the results of a potentiometric titration. The titration was carried out using a silver sulfide electrode and a glass reference electrode according to the method of Lykken, L., and Tuemmler, F. D. (Industrial and Engineering Chemistry, Analytical Edition 14, p. 67–9 (January 1942)), as extended to black liquor by Barlew, P. B., and Pascoe, T. A. (Paper Trade Journal 122, No. 10, TAPPI Section, pp. 99–102 (March 7, 1946)).

TABLE III

Sulfur balance

| Test No. | Sulfur in Black Liquor (gms.) | Sulfur in— | | Sulfur Evolved (By Difference) (gms.) | Percent Sulfur Reduction |
| --- | --- | --- | --- | --- | --- |
| | | Filtrate+Precipitate (gms.) | | | |
| 1 | 0.567 | 0.147 | 0.065 | 0.355 | 62.6 |
| 2 | 0.548 | 0.160 | 0.058 | 0.330 | 60.2 |
| 3 | 0.494 | 0.160 | 0.042 | 0.292 | 59.1 |
| 4 | 0.494 | 0.262 | 0.055 | 0.177 | 35.8 |
| 5 | 0.510 | 0.201 | 0.024 | 0.285 | 55.9 |
| 6 | 0.510 | 0.166 | 0.039 | 0.305 | 59.8 |

Sodium balances are shown in Table IV and indicate that very little sodium is associated with the precitated lignin. The discrepancy between values for 1 and 2 appears to be due to a high figure for the original liquor.

TABLE IV

Sodium balance

| Test No. | Sodium in Black Liquor (gms.) | Sodium in— Filtrate + Precipitate = Total (gms.) | | |
| --- | --- | --- | --- | --- |
| 1 | 3.40 | 2.54 + | 0.46 | = 3.00 |
| 2 | 3.29 | 2.59 + | 0.28 | = 2.87 |
| 3 | 3.07 | 2.81 + | 0.22 | = 3.03 |
| 4 | 3.07 | 2.91 + | 0.27 | = 3.18 |

In another aspect of the invention, the process of pressure carbonation and vacuum stripping is applied to sulfide-containing black liquors from the alkaline refining of wood pulps which have already been at least partially delignified by prior treatments, such as by an acid sulfite digestion followed by chlorination and washing. In this case, little lignin will be present in the black liquor and no substantial amount of lignin will precipitate during carbonation or stripping. However, the previously outlined advantages will be obtained in regard to recovering concentrated hydrogen sulfide, reducing sulfur losses, reducing the odor nuisance, and improving the flow properties of the resulting smelt when these liquors are furnaced for chemical recovery. Thus, the invention may be applied as a method of lowering the sulfidity of sulfide-containing effluents from the alkaline refining of pulp at elevated temperatures with solutions containing sodium carbonate and sodium sulfide. The treatment is particularly advantageous when applied to the effluent from the refining of sulfite pulp with sodium carbonate and sodium sulfide according to the process of copending application, Serial No. 290,209, of Arthur N. Parrett, filed May 27, 1952. The black liquor carbonation and stripping process is also applicable to treatment of sulfide-containing effluents from the refining of substantially delignified pulp at elevated temperatures with solutions containing sodium sulfide and sodium hydroxide.

Where the effluents come from refining with mixtures of sodium carbonate and sodium sulfide; mixtures of sodium hydroxide and sodium sulfide, or mixtures of all three, the liquor, following removal of volatile sulfide, may be furnaced and burned to recover the inorganic components as a smelt. Where refining is carried out with a mixture of sodium sulfide and sodium carbonate, the concentrated hydrogen sulfide evolved in the carbonation treatment may be absorbed in a solution of smelt and reused directly in refining. Where refining is by a solution containing sodium hydroxide in addition to sodium sulfide, all or a portion of the smelt solution may be subjected to a causticizing treatment either before or after absorption of hydrogen sulfide recovered from the black liquor carbonation treatment.

Fig. 2 of the accompanying drawings illustrates by flowsheet an integrated cyclic operation embodying the invention. As illustrated in the flow-sheet, the black liquor carbonation process of the invention may be applied to provide a complete cyclic process of soda-base acid sulfite pulping and alkaline refining of sulfite pulp with recovery of both sulfite pulping and refining chemicals for use in the process. In this integrated process the chemicals used in alkaline refining are a mixture of carbonate and sulfide, as described in copending application of Arthur N. Parrett, Serial No. 290,209, filed May 27, 1952. The alkaline refining effluent containing sodium sulfide is treated according to the invention by a pressure carbonation and vacuum stripping, effecting removal of concentrated hydrogen sulfide and producing a treated effluent of lowered sulfidity. This treated effluent is combined with the effluent sulfite waste liquor from the acid sulfite pulping operation. The combined liquor is then evaporated and burned in a recovery furnace of the type used in conventional kraft operations whereupon a smelt is obtained consisting predominately of sodium carbonate and sodium sulfide. The concentrated hydrogen sulfide, recovered from the vacuum stripping, is of such strength as to readily support combustion, and is burned to provide sulfur dioxide for use in reconstituting soda-base acid sulfite wood digestion liquor (a mixture of sodium bisulfite and free sulfurous acid).

The smelt consisting predominantly of sodium carbonate and sodium sulfide is dissolved and clarified and then is divided into two portions. One portion may be used directly in alkaline refining. The other portion may be treated by the ion exchange process of Letters Patent 2,656,244, of Kenneth Russell Gray and Hartzell Lance Crosby, to produce soda-base acid sulfite digestion liquor directly. According to this process, the solution containing this portion of the smelt is contacted with a carboxylic acid-type or phenolic-type cation exchange resin in hydrogen form whereby sodium is adsorbed on the resin and a mixture of $CO_2$ and $H_2S$ may be evolved. The adsorbed sodium is subsequently desorbed from the resin by a sulfurous acid solution to produce soda-base acid sulfite digestion liquor. The aqueous effluent from this resin treatment containing unadsorbed cations and anions may be added to the smelt dissolving tank as shown in Fig. 1. Any mixture of $CO_2$ and $H_2S$ evolved may be added to the H₂S evolved from the vacuum stripper or may be mixed with the flue gas or other CO₂-containing gas going to the pressure carbonation operation.

This integrated process has a number of important advantages. One of these is that by reduction of the sulfur content it permits practical furnacing of sulfite waste liquor to provide a fluid smelt. In this process, the sulfide content of the alkaline effluent is first substantially eliminated by a simple solution carbonation using raw flue gas, whereupon sulfite waste liquor may be added and the combined waste effluents, still having a favorable soda-to-sulfur ratio, may be practically evaporated and furnaced. One particular advantage of the integrated process is that the combined acid and alkaline effluents will be easier to furnace than either effluent alone due to the high inorganic content contributed by the alkaline effluent and the high fuel value contributed by the sulfite waste liquor. Carbonation of the alkaline effluent permits elimination of sufficient sulfur from the alkaline effluent, prior to combining with the sulfur-containing sulfite waste liquor, that on combination the sodium-to-sulfur ratio is still favorable for obtaining a fluid smelt without the necessity of adding fluxing chemicals, such as sodium carbonate prior to furnacing. In this way not only is a suitable low melting smelt obtained, but sulfur losses in furnacing are minimized as well.

Alternatively, in place of being treated by said ion exchange process, the portion of smelt solution to be used for the preparation of acid-sulfite digestion liquor may be treated by the multistage solution process of our abandoned application, Serial No. 166,681, filed June 7, 1950, which subject matter is now incorporated in application Serial No. 415,857, filed March 12, 1954, now Patent No. 2,724,292, granted Nov. 22, 1955, to produce a solution of sulfide-free sodium carbonate. This is accomplished by subjecting a portion of the dissolved smelt to a plurality of carbonation treatments under pressure and at an elevated temperature with a gas consisting at least in part of carbon dioxide, each such carbonation treatment being followed by stripping under vacuum to remove volatile hydrogen sulfide in concentrated form whereby sodium salts of carbonic acid are obtained as a solution substantially free from sulfide. This, by reaction with sulfur dioxide or sulfur dioxide-containing gas, may be converted to soda-base acid sulfite digestion liquor. Only a sufficient amount of flue gas need be purified from suspended solids to treat the portion of the soda chemicals which are to be converted into acid-sulfite digestion liquor. Frequently this amount of CO₂ will be readily available in comparatively pure form from an alternative source, such as from the reaction of sodium carbonate with SO₂.

We claim:

1. In the process of preparing wood pulp wherein an alkaline digestion is carried out with a sodium sulfide-containing solution and in which sulfide-containing waste black liquor is evaporated and burned to produce a smelt for the recovery of chemicals, the improvement which comprises carbonating the waste black liquor with carbon dioxide under pressure and then stripping hydrogen sulfide from the carbonated liquor under a vacuum reducing the sulfide sulfur content of the liquor substantially, thereby reducing sulfur losses, recovering concentrated hydrogen sulfide, and minimizing obnoxious odors, and then evaporating the stripped liquor and burning the resulting concentrate.

2. In the process of claim 1, said pulping operation having been carried out on wood which has been subjected to a prehydrolysis treatment.

3. In the process of claim 1, carrying out the carbonation at a pressure of from 20 to 165 pounds per square inch absolute and at a temperature of from 50° to 150° C. and the stripping under a vacuum of from 5 to 29 inches of mercury.

4. In the process of claim 1, carrying out the pulping operation wtih digestion liquor in which the percentage of the total Na₂O present as Na₂S is from 45% to 70%.

5. The improvement in waste liquor treatment which comprises carbonating the sulfide containing waste black liquor from an alkaline digestion with carbon dioxide under pressure of from 20 to 165 pounds pressure per square inch absolute at a temperature below 70° C. to prevent agglomeration of the lignin precipitated in the liquor, subjecting the liquor to a stripping operation under a vacuum to remove concentrated hydrogen sulfide while maintaining the precipitated lignin in fine suspension, and then evaporating the stripped liquor and burning the resulting concentrate.

6. In the process of claim 5, wherein the black liquor was from an alkaline digestion carried out on wood which had been subjected to a prehydrolysis treatment.

7. In the process of claim 5, while maintaining agitation, heating the stripped liquor to a temperature above the sintering temperature of the moist dispersed lignin to effect a partial agglomeration, cooling the liquor below the lignin sintering temperature to eliminate tackiness and provide a granular precipitate, filtering and washing said precipitate.

8. In the process of claim 5, wherein the kraft type pulping operation is carried out with wood which has been subjected to a prehydrolysis treatment, heating the stripped liquor while maintaining agitation to a temperature above the sintering temperature of the moist dispersed lignin to effect a partial agglomeration, cooling the liquor below the lignin sintering temperature to eliminate tackiness and provide a granular precipitate, filtering and washing said precipitate.

9. In the process of claim 5, wherein the stripped liquor is heated to a temperature of about 80° C. to agglomerate the precipitated lignin.

10. In the process of claim 9, pulping a hardwood and treating the separated lignin with a strong mineral acid followed by washing and drying to produce a lignin having a relatively low melting point.

11. In a kraft type pulping operation in which the waste black liquor is evaporated and burned to produce a smelt for the recovery of chemicals, the improvement which comprises carbonating the liquor with carbon dioxide under pressure while maintaining precipitated lignin in suspension in the liquor and without releasing any appreciable amount of hydrogen sulfide, subjecting the carbonated liquor to a steam stripping operation for removal of concentrated hydrogen sulfide, concentrating and removing the lignin from the liquor, and then evaporating the stripped liquor and burning the resulting concentrate.

12. The improvement in waste liquor treatment which comprises carbonating the sulfide containing waste black liquor from an alkaline digestion with carbon dioxide under pressure of from 20 to 165 pounds pressure per square inch absolute at a temperature above 90° C. to melt and liquefy a portion of the lignin in the liquor, separating this lignin, subjecting the partially delignified liquor to a stripping operation under a vacuum to remove concentrated hydrogen sulfide, and evaporating the stripped liquor and burning the resulting concentrate.

13. In the processes of claim 12, dissolving the separated lignin in waste black liquor to produce a waste liquor concentrate for burning.

14. In the process of preparing high alpha pulp and recovering chemicals, in which largely delignified pulp from the acid sulfite digestion of wood is subjected to an alkaline digestion with a solution containing sodium sulfide, the improvement comprising (1) treating the sulfide-containing effluent from the alkaline digestion with a carbon dioxide-containing gas and subjecting the treated effluent to steam stripping under vacuum whereby concentrated hydrogen sulfide is evolved and the sulfur content of the liquor is substantially reduced, and (2) evaporating and combusting the resulting solution with lowered sulfur content to produce a low melting smelt.

15. In the process of preparing high alpha pulp and recovering chemicals, in which largely delignified pulp from the acid sulfite digestion of wood after chlorination and washing is subjected to an alkaline digestion with a liquor containing a mixture of sodium compounds consisting of sodium sulfide and at least one sodium compound selected from the group consisting of sodium carbonate and sodium hydroxide, said sodium hydroxide representing not more than 15% of the total sodium in the mixture, the improvement comprising (1) treating the sulfide-containing effluent from the alkaline digestion with a carbon dioxide-containing gas and subjecting the treated effluent to steam stripping under vacuum whereby concentrated hydrogen sulfide is evolved and the sulfur content of the liquor is substantially reduced, and (2) evaporating and combusting the resulting solution with lowered sulfur content to produce a low melting smelt.

16. In the process of claim 1, contacting the smelt solution with at least a portion of the elevated hydrogen sulfide to increase the sulfide content of the solution prior to use in the alkaline digestion.

17. In the process of recovering high alpha pulp and recovering chemicals, in which wood is digested in soda-base acid sulfite liquor to produce largely delignified sulfite pulp and in which said sulfite pulp after chlorination and washing is subjected to an alkaline digestion with a liquor containing a mixture of sodium compounds consisting of sodium sulfide and at least one sodium compound selected from the group consisting of sodium carbonate and sodium hydroxide, said sodium hydroxide representing not more than 15% of the total sodium in the mixture, the improvement comprising (1) subjecting the effluent from the soda-base acid sulfite digestion to steam stripping to remove a substantial portion of the free and loosely combined sulfur dioxide, (2) treating the sulfide containing effluent from the alkaline digestion with a carbon dioxide-containing gas and subjecting the treated effluent to steam stripping under vacuum whereby concentrated hydrogen sulfide is evolved and the sulfur content of the effluent is substantially reduced, (3) combining the treated alkaline effluent of lowered sulfur content with the stripped soda-base sulfite waste liquor in such proportion that the ratio of organic-to-inorganic solids is substantially increased over that in said alkaline effluent and that sulfur-to-sodium ratio on an atomic basis does not exceed 0.25, and (4) evaporating and combusting the combined effluents to produce a low melting smelt.

18. In the process of claim 17, contacting the smelt solution with at least a portion of the evolved hydrogen sulfide to increase the sulfide content of the solution prior to use in alkaline digestion.

19. In the process of claim 17, the recovery of the sodium base used in the acid sulfite digestion comprising contacting a portion of the dissolved smelt wtih a carboxylic resin in hydrogen form whereby hydrogen sulfide and carbon dioxide are evolved and sodium is adsorbed on the resin, treating the resin containing adsorbed sodium with a sulfur dioxide solution whereby sodium is removed from the resin and a solution of sodium bisulfite and sulfurous acid is produced for use in the acid sulfite digestion of wood.

References Cited in the file of this patent

UNITED STATES PATENTS

| | | |
|---|---|---|
| 1,566,118 | Rawling | Dec. 15, 1925 |
| 1,640,853 | Richter | Aug. 30, 1927 |
| 1,786,890 | Braun | Dec. 30, 1930 |
| 1,822,125 | Blodgett et al. | Sept. 8, 1931 |
| 1,864,619 | Richter | June 28, 1932 |
| 1,870,650 | Richter | Aug. 9, 1932 |
| 1,973,557 | Bradley et al. | Sept. 11, 1932 |
| 2,167,556 | Smull | July 25, 1939 |
| 2,228,976 | Reboulet | Jan. 14, 1941 |
| 2,249,174 | Richter | July 15, 1941 |
| 2,406,867 | Tomlinson | Sept. 3, 1946 |
| 2,470,764 | Dunbar | May 24, 1949 |
| 2,574,193 | Savell | Nov. 6, 1951 |
| 2,611,682 | Mannbro | Sept. 23, 1952 |
| 2,623,040 | Keilen | Dec. 23, 1952 |

FOREIGN PATENTS

| | | |
|---|---|---|
| 137,831 | Great Britain | May 12, 1921 |

OTHER REFERENCES

Rue et al.: Paper Trade J., Oct. 8, 1925, pages 52 and 53.

Rue et al.: Chem. and Met. Eng., October 1927, page 611.

Schelhorn: Paper Trade J., Dec. 7, 1944, pages 39–44. (Copies in Sci. Lib.)